United States Patent [19]

Hahn et al.

[11] Patent Number: 4,472,099

[45] Date of Patent: Sep. 18, 1984

[54] RELEASABLE LOCKING DEVICE

[75] Inventors: Norbert Hahn, Cudahy; Steven J. Hipp, Milwaukee, both of Wis.

[73] Assignee: Rite-Hite Corporation, Milwaukee, Wis.

[21] Appl. No.: 278,168

[22] Filed: Jun. 29, 1981

[51] Int. Cl.³ .................... B65G 67/02; B65G 69/22
[52] U.S. Cl. .................................. 414/401; 14/71.1; 292/100
[58] Field of Search ............. 414/396, 401, 402, 584; 14/71.1; 292/96, 98, 100, 201; 60/385; 91/460; 417/903; 298/23 M; 180/89.14, 89.15

[56] References Cited

U.S. PATENT DOCUMENTS

| | | | |
|---|---|---|---|
| 1,342,465 | 6/1920 | Schneider | 292/201 X |
| 2,237,192 | 4/1941 | Minkow et al. | 292/201 X |
| 3,884,056 | 5/1975 | East et al. | 292/98 X |
| 3,944,017 | 3/1976 | Foster | 180/89.15 |
| 4,264,259 | 4/1981 | Hipp | 414/401 |
| 4,282,621 | 8/1981 | Anthony et al. | 414/401 X |

*Primary Examiner*—Leslie J. Paperner

*Attorney, Agent, or Firm*—Neuman, Williams, Anderson & Olson

[57] ABSTRACT

A device is provided for releasably securing a parked vehicle to an adjacent structure. The device includes a pivotally mounted elongated unit which is movable between a vehicle-interlocking operative mode and a vehicle-release inoperative mode. The elongated unit is mounted on a carriage, which is connected to the structure. The elongated unit is moved from an inoperative mode to an operative mode by hydraulic power means. The hydraulic power means includes a piston-cylinder assembly having the cylinder thereof pivotally connected to the carriage and the exposed end of the piston in operative engagement with the elongated unit whereby movement of the piston in one relative direction effects movement of the elongated unit from the inoperative mode to the operative mode. The power means also includes a manually operable pump means remotely situated relative to the carriage, and an elongated flexible pressure-transmitting means having one end thereof connected to the cylinder and the opposite end connected to the pump means.

2 Claims, 5 Drawing Figures

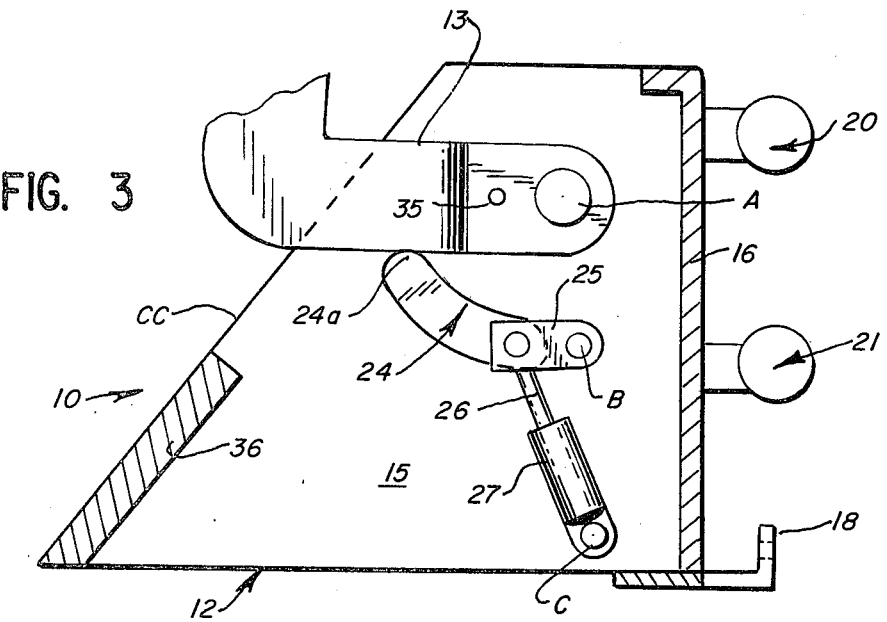
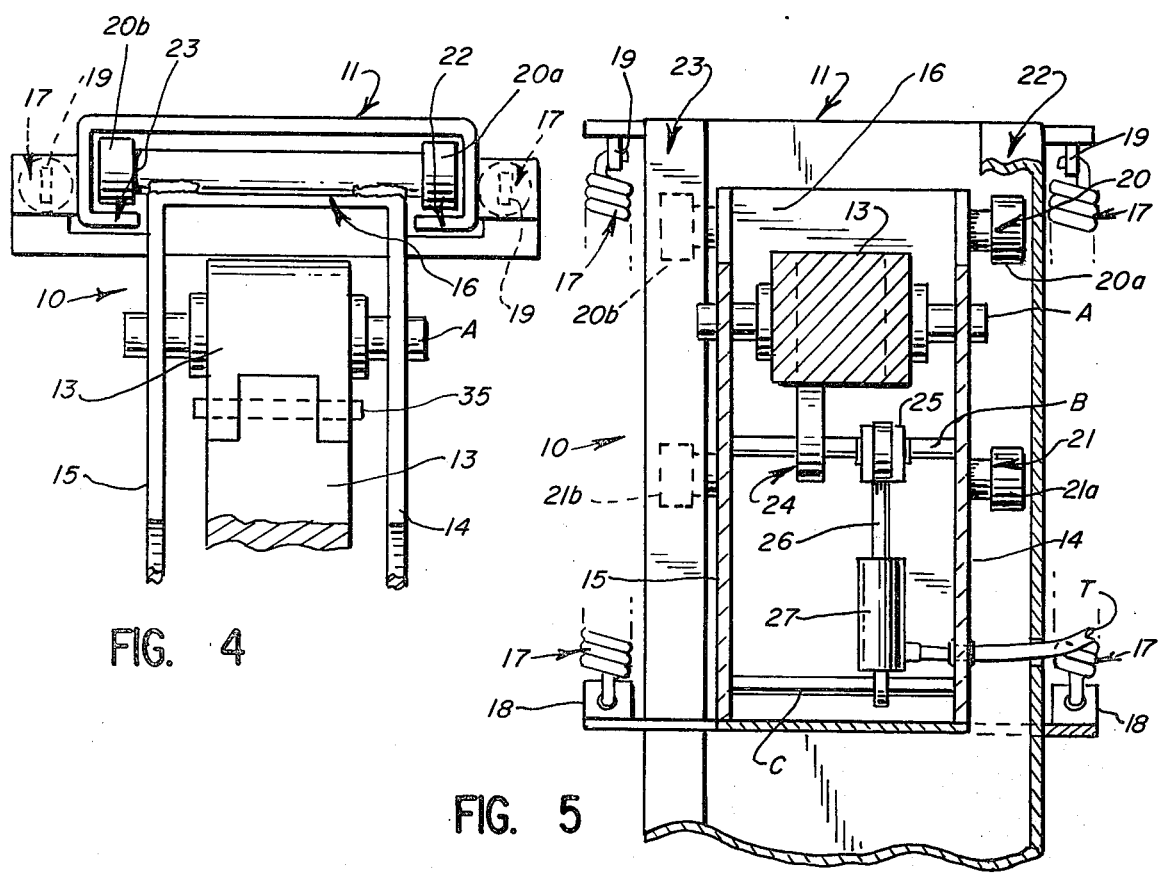

RELEASABLE LOCKING DEVICE

BACKGROUND OF THE INVENTION

Positive retention of a parked vehicle against a loading dock during loading and unloading thereof is essential from a safety standpoint. Heretofore, attempts at effecting such retention were to either rely merely on the brakes of the vehicle per se; utilize blocks which were wedged between the roadway on which the vehicle was parked and the front side of a pair of the vehicle wheels; or use of retaining chains or cables secured between the vehicle and a portion of the loading dock. Each of the aforegoing means were oftentimes ineffective because (1) the brakes were not properly set; (2) the blocks became lost or the roadway surface was slippery; or (3) the chain or cable was ignored because it was awkward, time-consuming, and required an inordinate amount of manual effort to apply.

In other instances, prior locking devices were of costly and complex design; were highly susceptible to malfunction particularly when exposed to various climatic conditions; were difficult and expensive to install on a loading dock; and/or they restricted or interfered with the full use of the loading dock.

SUMMARY OF THE INVENTION

Thus, it is an object of the invention to provide an improved locking device of the type described which is not beset with any of the aforenoted shortcomings.

It is a further object to provide an improved locking device which is of simple, inexpensive construction; may be readily installed on new or existing loading docks; and does not require special outside power sources (e.g. electric motors, etc.).

It is a still further object to provide an improved locking device which may be readily actuated from a safe, remote location.

It is a still further object to provide an improved locking device which is operable under widely varying climatic conditions.

It is a still further object to provide an improved locking device which is capable of being effectively utilized with vehicles which vary over a wide range in size and configuration.

Further and additional objects will appear from the description, accompanying drawings, and appended claims.

In accordance with one embodiment of the invention, a locking device is provided for releasably securing a parked vehicle to an adjacent structure such as a loading dock or the like. The device includes a pivotally mounted elongated unit which is attached to the adjacent structure. The unit is adapted to move between a vehicle-interlocking operative mode and a vehicle-release inoperative mode. Movement of the elongated unit from an inoperative mode to an operative mode is effected by a hydraulic power means. The power means includes a manually operable pump means remotely disposed relative to the elongated unit, and an elongated flexible pressure-transmitting means having one end portion thereof operatively connected to the elongated unit and the other end portion connected to the pump means.

DESCRIPTION

For a more complete understanding of the invention, reference is made to the drawings wherein:

FIG. 3 is an enlarged fragmentary side view of the device of FIG. 2, but with a portion of the carriage removed so as to expose various components substantially concealed within the carriage.

FIG. 4 is an enlarged fragmentary top view of the device of FIG. 2.

FIG. 5 is an enlarged sectional view taken along line 5—5 of FIG. 2.

Figure 1:
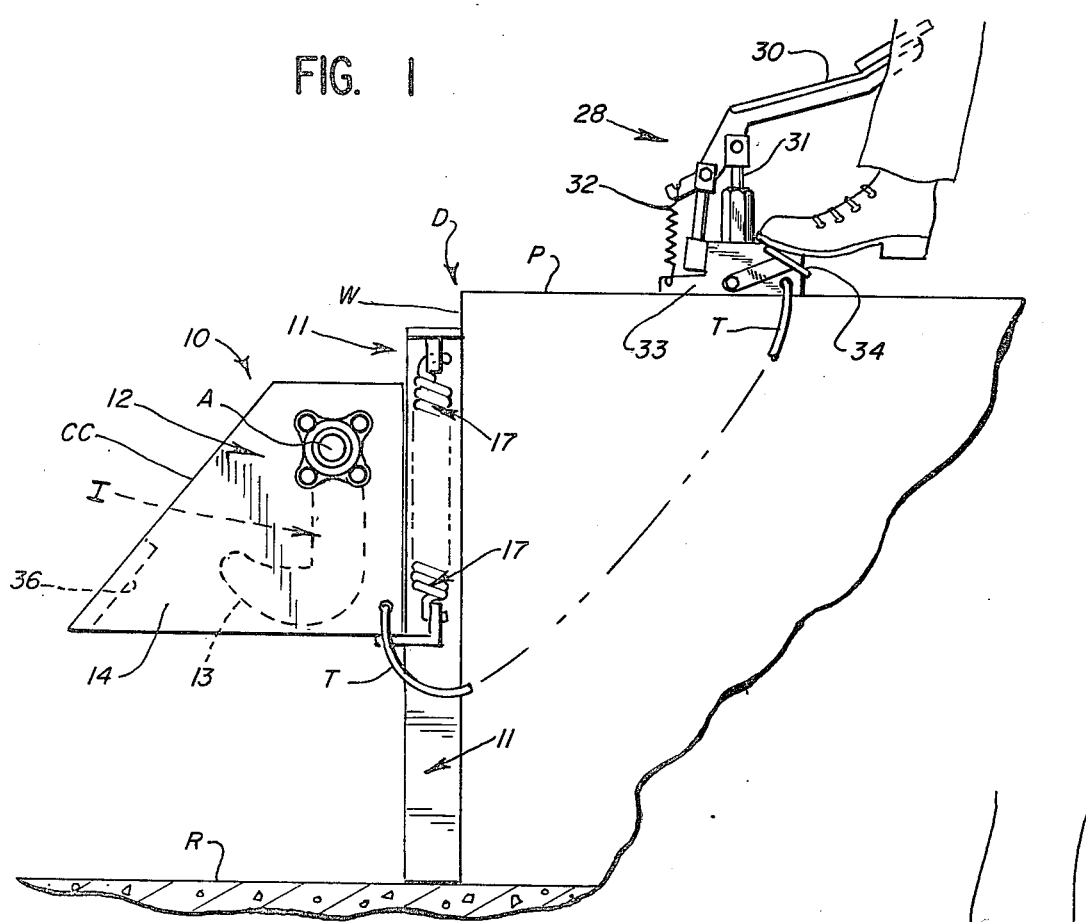
FIG. 1 is a fragmentary side elevational view of one form of the improved locking device shown installed on the front wall of a conventional loading dock, and with the elongated unit thereof disposed in an inoperative mode.
Figure 2:
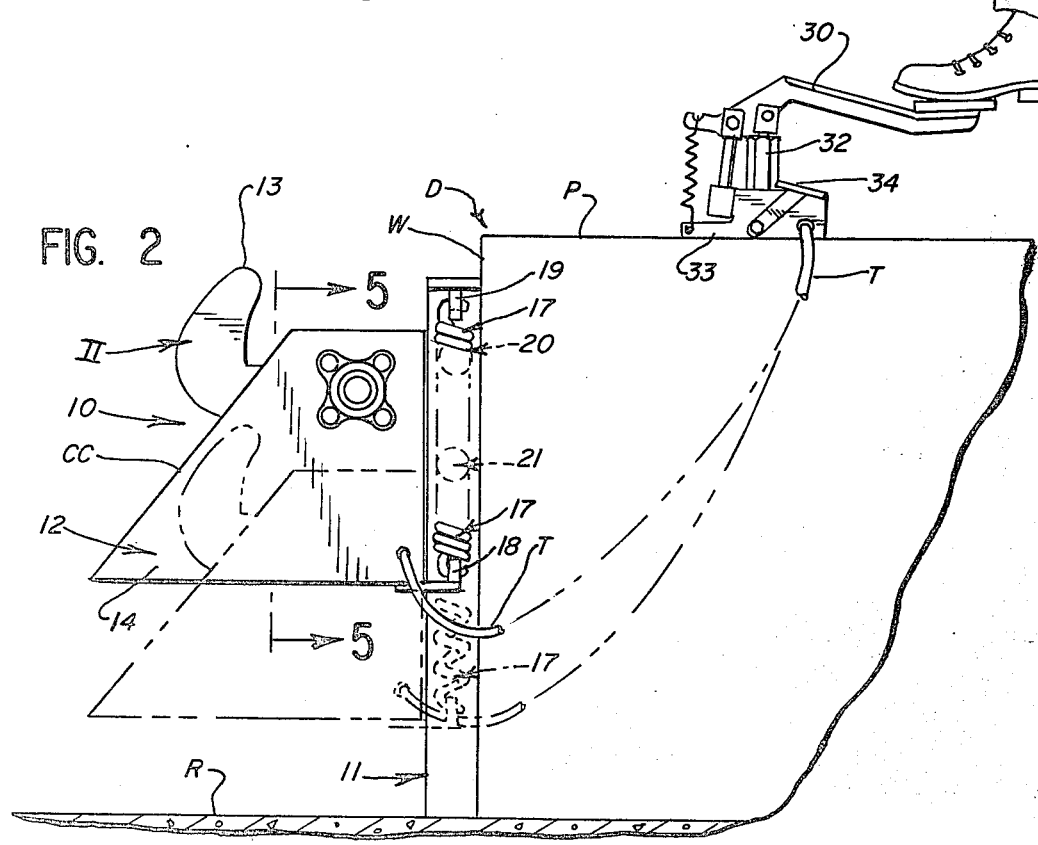
FIG. 2 is similar to FIG. 1 but with the elongated unit disposed in an operative mode; the unit and the carriage on which it is mounted are also shown in phantom lines in a downwardly depressed position.

Referring now to the drawing and, more particularly, to FIGS. 1 and 2, one form of the improved locking device 10 is shown mounted on the front vertical wall W of a conventional loading dock D. The wall W extends from a roadway R, which supports the parked vehicle, not shown, to an elevated, horizontally disposed platform surface P. The height of surface P approximates the height of the vehicle bed, the latter supporting the products to be loaded onto or unloaded from the vehicle. Because of this height relationship, fork-lift trucks, dollies, and the like may be conveniently utilized to assist in the loading and unloading operations.

Device 10 is secured to wall W by a mounting bracket or member 11 which is anchored thereto by any suitable means (e.g. anchor bolts). Mounted on bracket 11 and projecting outwardly therefrom is a carriage 12. The carriage is mounted so as to be capable of limited vertical relative movement as will be described more fully hereinafter.

Pivotally mounted on carriage 12 is an elongated hook-like unit 13 which is adapted to pivot independently of the carriage about a horizontal shaft A between an inoperative mode I, shown in dotted lines in FIG. 1 and an operative mode II, shown in FIG. 2. Carriage 12 in the illustrated embodiment includes a pair of spaced, substantially parallel vertical plate members 14, 15 which project transversely from the bracket 11. Shaft A is supported by plate members 14, 15 and extends therebetween. The vertical marginal portion of the members 14, 15, adjacent bracket 11, are interconnected by a web section 16. The opposite, or outer, marginal portion of members 14, 15 are vertically inclined upwardly toward the wall W and form a cam CC which is adapted to be engaged by a conventional IC bar depending from the rear of the vehicle, when the latter is backed into a parked position with respect to the loading dock D. By reason of the cam configuration, the carriage 14 and associated components to be hereinafter identified, will in most instances move downwardly from its normal elevated rest position, as seen more clearly in FIG. 2. The carriage 14 assumes its normal rest position by reason of a pair of heavy duty springs 17 which engage a pair of lugs 18 affixed to corresponding lower portions of plate members 14, 15. The upper end of each spring 17 is anchored to a lug 19 extending laterally from the upper end of bracket 11.

To confine the vertical movement of carriage 14 to a predetermined path, complemental guide means are provided on the bracket 11 and the carriage 14. As will be noted in FIGS. 3, 5, a pair of laterally extending arms 20, 21 are secured by welding or the like to the exposed rear surface of web section 16. Each arm has the ends 20a-b, 21a-b thereof projecting laterally a like amount beyond the plane of the adjacent plate member. Corresponding arm ends are disposed within suitable elongated vertically extending guideways 22, 23 formed along opposite side marginal portions of the bracket 11. In the embodiment shown in FIG. 4, each guideway 22, 23 is substantially channel-shaped with the open elongated sides of the channels being opposed to one another. To reduce friction between the arm ends and the guideways 22, 23, suitable rollers may be carried on the arm ends.

As noted in FIGS. 3 and 5, the arms 20, 21 are vertically spaced relative to one another, thereby providing added stability to the carriage, as the latter moves vertically relative to bracket 11.

Positioned beneath the horizontally disposed shaft A on which the elongated unit 13 is mounted, and spanning the distance between the plate members 14, 15 is a second shaft B. The ends of shaft B are preferably journalled in the plate members. Keyed to shaft B is a lever 24 having a protruding end 24a slidably engaging the underside of unit 13 at a substantial distance from shaft A. To facilitate the sliding contact between the lever 24 and the underside of unit 13, the end 24a of the lever is preferably rounded.

Also keyed to shaft B and spaced longitudinally from lever 24, is a link 25 to which the upper exposed end of a piston 26 is pivotally connected. The opposite end of piston 26 is concealed within an hydraulic cylinder 27. The lower end of cylinder 27 is pivotally connected to a third shaft C, the latter being supported by and spanning the distance between plate members 14, 15, see FIGS. 3 and 5.

In the illustrated embodiment, piston 26 is a single acting piston; that is to say it is driven by hydraulic pressure in only one direction (e.g., upwardly) so that link 25 will pivot in a clockwise direction about the axis of shaft B. Because both link 25 and lever 24 are keyed to shaft B, lever 24 will also move in a clockwise direction and apply upwardly pushing pressure on the underside of unit 13 thereby causing the latter to assume its operative mode II. Once hydraulic pressure within cylinder 27 is relieved, the weight of unit 13 will cause the latter to move to a depending inoperative mode I.

To effect the necessary hydraulic pressure within cylinder 27 in order to cause piston 26 to move outwardly therefrom and overcome the weight and resistance of unit 13 to move from the inoperative mode to the operative mode, a manually operated pump assembly 28 is provided which is preferably positioned at a remote location relative to the carriage 14. The type of pump assembly may vary considerably, but in the illustrated embodiment, it is of a conventional foot activated type, wherein a foot pumping pedal 30 is provided which is connected to a drive piston 31, the latter coacting with a cylinder 32 formed in the pump base 33. Connected to the pump base and communicating with the lower end of cylinder 32 is one end of a section of flexible tubing T. The opposite end of the tubing extends through a suitable opening formed in the carriage plate member 14 and is connected to the cylinder 27 adjacent the pivotally connected end of the latter. A suitable grommet may be provided in the plate member opening so as to enable the tubing T to readily slide endwise through the opening as the carriage moves vertically and as the cylinder 27 pivots about shaft C. There should be sufficient slack provided in the length of the tubing to permit such relative movement between the tubing and the plate member opening.

Besides the pumping pedal 30, the pump should be provided with a suitable release valve which may be activated by a secondary foot pedal 34. When pedal 34 is depressed, the hydraulic pressure confined within cylinder 27 will be released and the hydraulic fluid will flow back into the pump cylinder 32. The aforedescribed operation of the pump 30 is well understood in the pump art.

Where the loading dock D forms a part of a warehouse complex or the like, the pump 30 may be located inside a security door, whereby when the door is secured in a closed position, the pump cannot be operated by one outside the closed door. Thus, the incidence of unauthorized use or vandalism are markedly reduced.

Because of the utilization of hydraulic pressure as the driving force for actuating the locking device, the location of the pump 30 relative to carriage 14 is limited only by the length of the tubing T.

To prevent serious damage to the device in the event that the parked vehicle should suddenly be driven away from the dock while unit 13 is in interlocking engagement with the vehicle IC bar, the hook-like unit is formed into two sections which are connected to one another by a suitable shear pin 35, see FIGS. 3 and 4.

As seen in FIG. 3, the lower portions of the cam-forming marginal portions of plate members 14, 15 of carriage 12 are interconnected by a transversely extending spacer 36. Thus, the plate members are maintained in proper parallel spaced relation by the space 36.

When the elongated unit 13 is in interlocking relation with the parked vehicle, the IC bar of the latter will be captured behind the upwardly extending distal end of unit 13. While the parked vehicle is being loaded, the added weight being supported by the vehicle bed will exert a downward force on the unit which may be compensated for by the springs 17 and thus, result in the carriage 12 being moved downwardly the required amount and avoid damaging stresses and strains being imposed on the carriage and the hook-like unit.

Thus, an improved locking device has been provided which is of simple, inexpensive construction and one capable of being safely operated under widely varying climatic conditions. The improved device is capable of accommodating a wide variety of vehicles.

We claim:

1. A releasable locking device for securing a parked vehicle to an adjacent structure, said device comprising a first means provided with a first member fixedly mountable on the structure, a carriage mounted on said first member for limited relative vertical movement from a predetermined normal elevated rest position upon a depressing exterior force exceeding a predetermined magnitude being applied to said carriage, and an elongated unit having one end thereof pivotally mounted on said carriage; second means provided with a piston-cylinder assembly substantially concealed within said carriage, said assembly having a cylinder spaced from the elongated unit and having one end of the cylinder pivotally connected to said carriage beneath the unit pivotal axis, and a piston protruding from said cylinder and having an exposed portion operatively engaging said elongated unit when the latter is in said operative mode, the operative engagement between the piston exposed portion and the elongated unit including a lever pivotally connected to the carriage at a location intermediate the pivotal axes of said unit and said cylinder, the lever pivotal axis being substantially parallel to the unit pivotal axis, and means interconnecting the lever and piston exposed portion whereby movement of said piston in one direction effects movement of the lever whereby the elongated unit is moved thereby to an operative mode; and fluid power means for actuating the piston, said power means provided with a remotely disposed manually operable pump means, and an elongated, flexible, pressure-transmitting means interconnecting the cylinder and said pump means.

2. The releasable locking device of claim 1 wherein the piston-cylinder assembly and the lever are substantially concealed within said carriage when the elongated unit is in either of said modes.

* * * * *